(12) United States Patent
Kon et al.

(10) Patent No.: US 7,031,307 B2
(45) Date of Patent: Apr. 18, 2006

(54) PACKET ROUTING APPARATUS HAVING LABEL SWITCHING FUNCTION

(75) Inventors: Kazutomo Kon, Hadano (JP); Ken Watanabe, Kawasaki (JP); Kenji Ishida, Ebina (JP); Tokuhiro Niwa, Ebina (JP)

(73) Assignee: Hitachi, Ltd., Tokyo (JP)

( * ) Notice: Subject to any disclaimer, the term of this patent is extended or adjusted under 35 U.S.C. 154(b) by 882 days.

(21) Appl. No.: 10/093,756

(22) Filed: Mar. 7, 2002

(65) Prior Publication Data

US 2002/0194368 A1    Dec. 19, 2002

(30) Foreign Application Priority Data

Mar. 7, 2001    (JP)    ............................. 2001-062796

(51) Int. Cl.
*H04L 12/56*    (2006.01)
(52) U.S. Cl. ...................................... 370/389; 370/392
(58) Field of Classification Search ................ 370/389, 370/392, 395.3, 395.31, 395.5, 395.52, 395.54, 370/395.6, 400–402, 428, 469
See application file for complete search history.

(56) References Cited

U.S. PATENT DOCUMENTS

| 6,341,127 B1 * | 1/2002 | Katsube et al. ............. 370/352 |
| 6,538,991 B1 * | 3/2003 | Kodialam et al. .......... 370/229 |
| 6,822,940 B1 * | 11/2004 | Zavalkovsky et al. ...... 370/237 |

OTHER PUBLICATIONS

E. Rosen, et al., "Multiprotocol Label Switching Architecture," *Standards Track*, Network Working Group [Cisco Systems, Inc.; Force10 Networks, Inc.; Juniper Networks, Inc.], ©The Internet Society (Jan. 2001), pp. 1-61.

* cited by examiner

*Primary Examiner*—Brenda Pham
(74) *Attorney, Agent, or Firm*—Townsend and Townsend and Crew LLP

(57) ABSTRACT

A packet routing apparatus holds at the least one policy condition, and at the least one label corresponding to the respective policy condition. The packet routing apparatus receives a packet, and determines whether any layer information included in the packet information matches any policy conditions. If at the least one layer information matches any policy condition, a label corresponding to this policy condition is extracted. The packet routing apparatus attaches the label to the packet and transmits the packet.

16 Claims, 12 Drawing Sheets

FIG.4

| POLICY CONDITION NO. 401 | OSI LAYER 1 INFORMATION 402 | OSI LAYER 2 INFORMATION 403 | OSI LAYER 3 INFORMATION 404 | OSI LAYER 4 INFORMATION 405 | OSI LAYER 5 INFORMATION 406 | OSI LAYER 6 INFORMATION 407 | OSI LAYER 7 INFORMATION 408 |
|---|---|---|---|---|---|---|---|
| 1 | | | SIP1 | | | | |
| 2 | | | SIP2 | | | | |
| 3 | | MAC1 VLAN1 | | | | | |
| 4 | | MAC2 VLAN2 | | | | | |
| 5 | | | QoS1 | TCP1 | HTTP1 | | |
| 6 | | | QoS2 | UDP1 | RTP1 | | |
| . | | | | | | | |
| . | | | | | | | |

FIG.9

| POLICY CONDITION NO. 401 | OSI LAYER 1 INFOR- MATION 402 | OSI LAYER 2 INFOR- MATION 403 | OSI LAYER 3 INFOR- MATION 404 | OSI LAYER 4 INFOR- MATION 405 | OSI LAYER 5 INFOR- MATION 406 | OSI LAYER 6 INFOR- MATION 407 | OSI LAYER 7 INFOR- MATION 408 | FEC 602 |
|---|---|---|---|---|---|---|---|---|
| 1 | | | SIP1 | | | | | FEC1 |
| 2 | | | SIP2 | | | | | FEC2 |
| 3 | | MAC1 VLAN1 | | | | | | FEC3 |
| 4 | | MAC2 VLAN2 | | | | | | FEC4 |
| 5 | | | QoS1 | TCP1 | HTTP1 | | | FEC5 |
| 6 | | | QoS2 | UDP1 | RTP1 | | | FEC6 |
| . | | | | | | | | |
| . | | | | | | | | |

920, 921, 922, 923, 924, 925

PACKET ROUTING APPARATUS HAVING LABEL SWITCHING FUNCTION

BACKGROUND OF THE INVENTION

The present invention is related to an internetwork apparatus for routing packets, and more particularly, to an internetwork apparatus for routing packets using MPLS (MultiProtocol Label Switching). An internetwork apparatus is, for example, a router or a LAN (Local Area Network) switch.

MPLS is a technology currently being developed into a standard by the MPLS working group of the IETF (Internet Engineering Task Force) as a key technology for intranets and the Internet backbone. As documentation related to MPLS, there is, for example, the RFC (Request for Comments) 3031 "Multiprotocol Label Switching Architecture" standardized and made public by IETF.

Label switching technology, featuring high-speed data transmission, scalability, and ease of traffic control, is utilized in MPLS. According to MPLS, FEC (Forwarding Equivalence Classes) are determined by a destination IP (Internet Protocol) address (hereinafter referred to as DIP) included in the IP header of a Layer 3 packet. Further, the same label is attached to each of the packets in a serial packet flow, in which the FEC is the same. The value of the label corresponds to that FEC. A packet attached with a label is routed by an MPLS-supporting internetwork apparatus by referring only to this label.

SUMMARY OF THE INVENTION

According to the above-mentioned MPLS, an FEC is generally determined by using only the DIP included in the IP header of a packet. Thus, when using an apparatus that supports MPLS, a network supervisor only can construct, operate and manage a network system based on Layer 3 IP routing information.

The present invention provides an internetwork apparatus capable of determining an FEC using layer information related to all the layers in the OSI (Open System Interconnection) 7-layer model. As layer information related to each layer of the OSI 7-layer model, for example, there is communication network media data, or protocol data of various types. The layer information thereof is included in a packet as packet information.

An internetwork apparatus of the present invention utilizes the layer information included in the packet information of a packet as a determination condition for FEC. Further, an internetwork apparatus manages such a determination condition. Using an internetwork apparatus of the present invention, a network supervisor can construct, operate and manage a network system according to a policy that is based not only on IP level routing information, but layer information related to each layer of the OSI 7-layer model as well.

BRIEF DESCRIPTION OF THE DRAWINGS

FIG. 4 shows the contents of policy conditions stored by a policy condition storage portion;

FIG. 9 shows an example of the constitution of a policy condition—FEC table;

DETAILED DESCRIPTION OF THE PREFERRED EMBODIMENTS

An embodiment of an internetwork apparatus of the present invention will be explained hereinbelow by referring to the figures.

Figure 1:
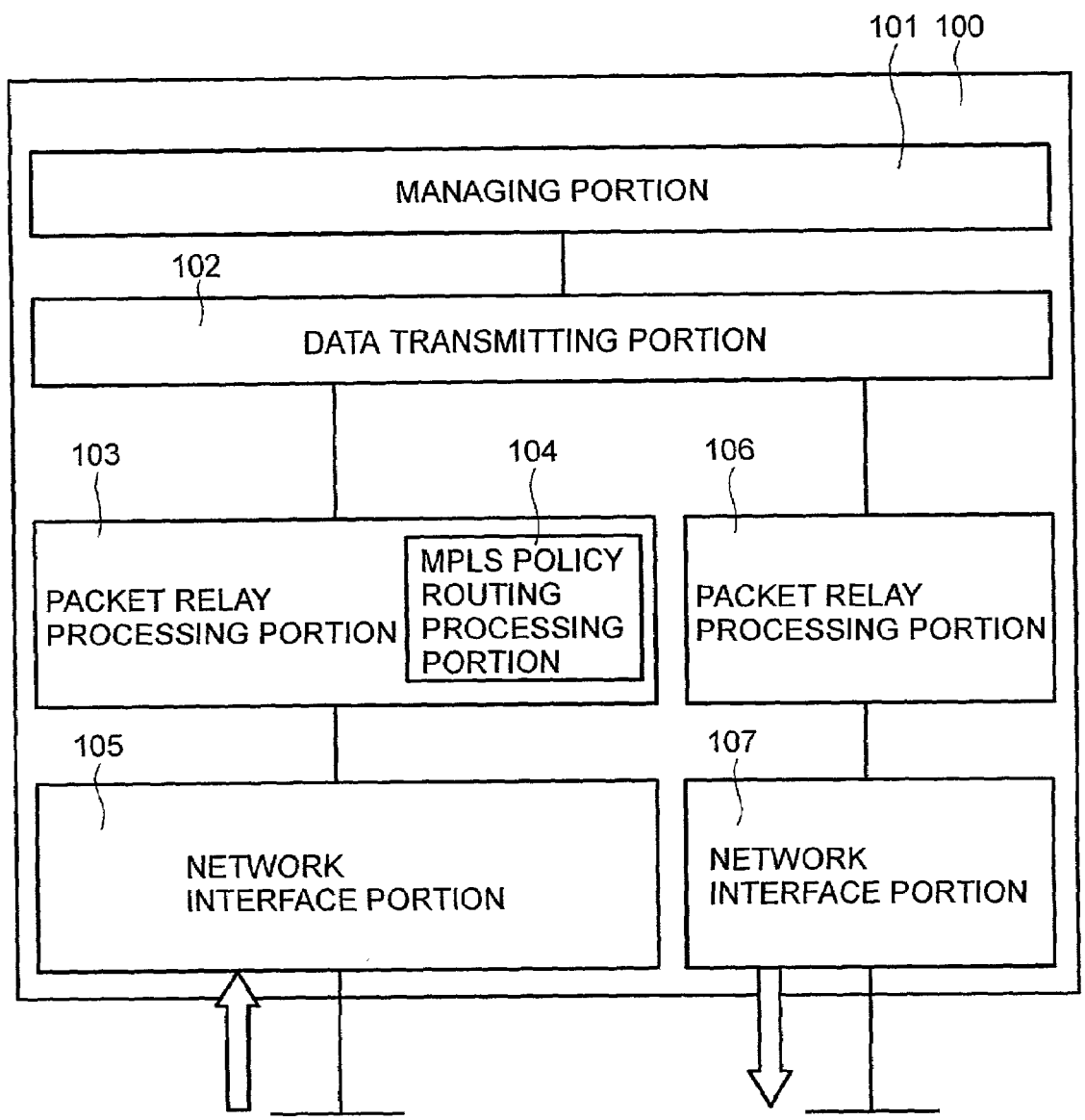
FIG. 1 shows the internal structure of an internetwork apparatus.

FIG. 1 shows the internal structure of an internetwork apparatus, which supports MPLS.

In FIG. 1, an internetwork apparatus 100 is constituted from a managing portion 101, a data transmitting portion 102, a packet relay processing portion 103, a packet relay processing portion 106, a network interface portion 105, and a network interface portion 107. In FIG. 1, internetwork apparatus 100 comprises two packet relay processing portions, and comprises two network interface portions. However, internetwork apparatus 100 can comprise three or more packet relay processing portions and network interface portions, respectively. Each packet relay processing portion will comprise the same constitution, and each network interface portion will comprise the same constitution.

Managing portion 101 mainly processes various routing information protocols and manages the overall apparatus. Data transmitting portion 102 is an interface for transmitting data between managing portion 101 and packet relay processing portions 103, 106. Transmitting portion 102, for example, is either a bus or a crossbar switch. Packet relay processing portions 103, 106 determine a routing destination network and routing packets according to routing information/label information. Network interface portions 105, 107 are network interfaces corresponding to each communication network media, and transmit and receive packets for various types of communication networks. A communication network media, for example, is the Ethernet developed by the Xerox Corporation, ISDN (Integrated Services Digital Network), ATM (Asynchronous Transfer Mode) and POS (Packet Over SDH/SONET) and the like. Packet relay processing portion 103 comprises an MPLS policy routing processing portion 104.

Figure 2:
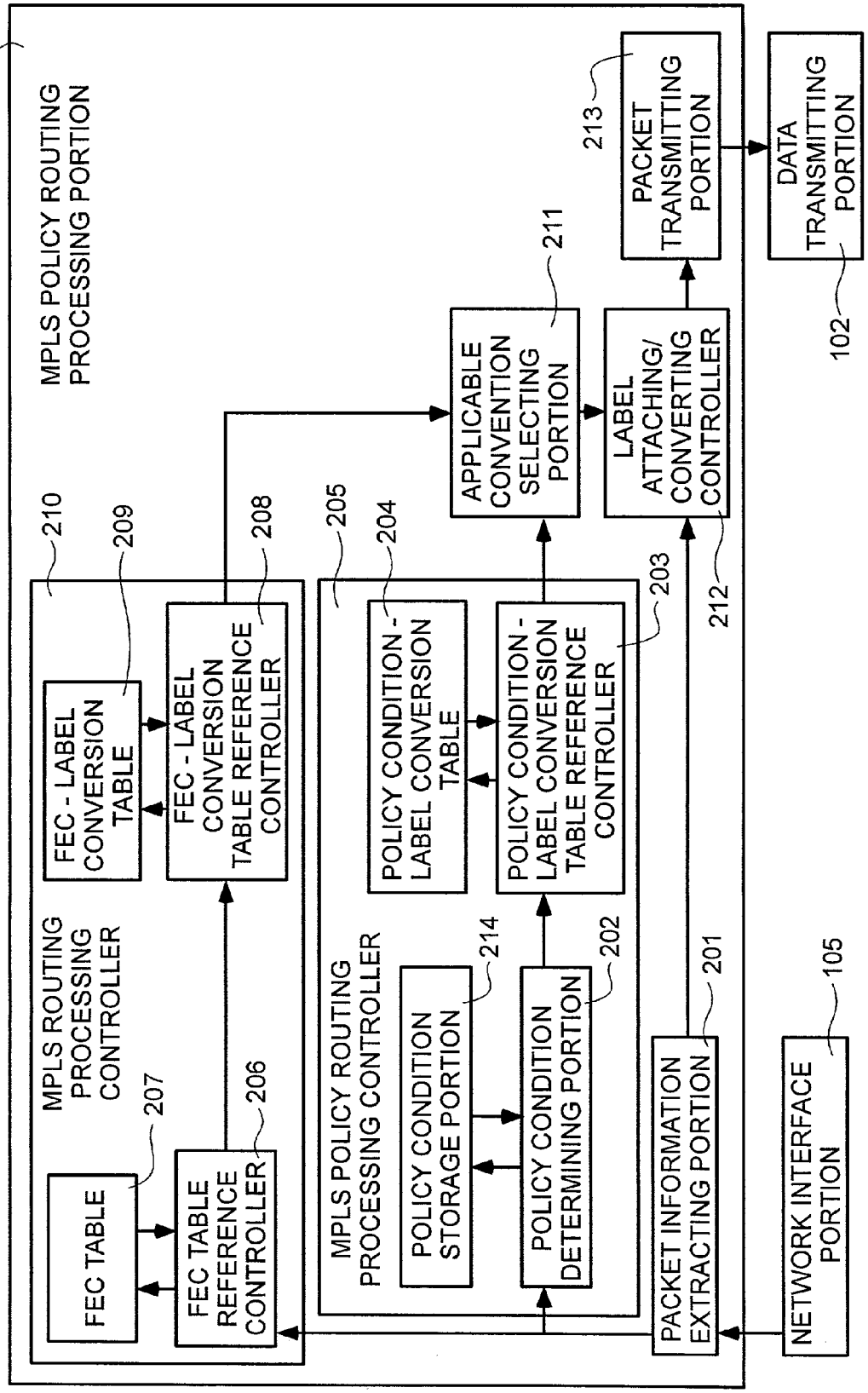
FIG. 2 shows an example of an internal structure of an MPLS policy routing processing portion.

FIG. 2 shows one example of the internal structure of MPLS policy routing processing portion 104.

As shown in FIG. 2, MPLS policy routing processing portion 104 includes a packet information extracting portion 201, an MPLS routing processing controller 210, an MPLS policy routing processing controller 205, an applicable convention selecting portion 211, a label attaching/converting controller 212 and a packet transmitting portion 213.

MPLS routing processing controller 210 includes an FEC table reference controller 206, an FEC table 207, an FEC—label conversion table reference controller 208, and an FEC—label conversion table 209. Further, MPLS routing processing controller 210 comprises memory not shown in the figure. FEC table 207 and FEC—label conversion table 209 are stored in this memory.

MPLS policy routing processing controller 205 includes a policy condition determining portion 202, a policy condition storage portion 214, a policy condition—label conversion table reference controller 203, and a policy condition—label conversion table 204. Further, MPLS policy routing processing controller 205 comprises memory not shown in the figure. Policy condition—label conversion table 204 is stored in this memory. Policy condition storage portion 214 can also store policy condition—label conversion table 204.

The route over which a packet is transmitted using MPLS is called LSP (Label Switched Path). LSP is a route established between at the least two or more internetwork apparatus (also called a Label Switching Router). One LSP is correspondent to the value of one FEC. Therefore, packets, which have the same FEC, are transmitted along the same LSP.

An internetwork apparatus, which supports MPLS, is operated as an Ingress internetwork apparatus, a Core internetwork apparatus, or an Egress internetwork apparatus, depending on where it is positioned on this LSP. An Ingress internetwork apparatus is an apparatus positioned at the entrance to an LSP. An Ingress internetwork apparatus determines the FEC of a received packet, attaches a label having a value corresponding to this FEC, and transmits the received packet via an LSP. A Core internetwork apparatus is an apparatus positioned midway along an LSP. A Core internetwork apparatus routes a packet transmitted from either an Ingress internetwork apparatus or a Core internetwork apparatus to either an Egress internetwork apparatus or another Core internetwork apparatus. An Egress internetwork apparatus is an apparatus positioned at the exit from an LSP. An Egress internetwork apparatus receives a packet transmitted from either an Ingress internetwork apparatus or a Core internetwork apparatus, removes the attached label, and sends the packet outside the LSP.

An LSP is established beforehand by two or more internetwork apparatus, which support MPLS. The respective internetwork apparatus establish a plurality of LSP by communicating with one another using dedicated protocols. In establishing each LSP, for example, each internetwork apparatus, which constitutes an Egress internetwork apparatus, determines and stores the values of labels corresponding to the respective LSP. Each Egress internetwork apparatus notifies the value of each label assigned to each LSP to either the Core internetwork apparatus or the Ingress internetwork apparatus to which it is connected. Each Core internetwork apparatus receives the value of each label determined for each LSP from either an Egress internetwork apparatus or another Core internetwork apparatus, respectively. And then, the Core internetwork apparatus also decides the respective label value for each LSP. The label value, which a Core internetwork apparatus assigns to each LSP, can differ from the label value assigned to the same LSP by another internetwork apparatus. A Core internetwork apparatus stores a label value received from another internetwork apparatus and a label value, which it has determined on its own, for each LSP. Further, a Core internetwork apparatus notifies either other Core internetwork apparatus or Ingress internetwork apparatus, to which it is connected, of the value of the label determined for each LSP. Each Ingress internetwork apparatus receives and stores each label value determined for each LSP from either each Egress internetwork apparatus or each Core internetwork apparatus.

As will be explained hereinbelow, each internetwork apparatus makes the value of each label determined for each LSP correspondent to the value of each FEC, and registers them in FEC—label conversion table 209. Further, each internetwork apparatus also makes the value of each label determined for each LSP correspondent to each of the policy conditions set beforehand, and registers them in a policy condition—label conversion table. Further, the label attaching/converting controller 212 of a Core internetwork apparatus stores a label value, which it determined itself, and a label value received from either an Egress internetwork apparatus or another Core internetwork apparatus, for each LSP.

Each internetwork apparatus can identify each LSP using a label value by storing a label value determined for each LSP. Thus, each internetwork apparatus can send and receive packets to and from each LSP in accordance with a label value attached to a packet.

Hereinbelow, the operation of MPLS policy routing processing portion 104 will be explained using figures for each of the Ingress internetwork apparatus, Core internetwork apparatus, and Egress internetwork apparatus. Furthermore, the same internetwork apparatus can be operated as an Ingress internetwork apparatus, Core internetwork apparatus and Egress internetwork apparatus, depending on the establishment of the LSP.

1. When an Internetwork Apparatus Operates as an Ingress Internetwork Apparatus 1-1. Packet Information Extracting Portion 201

A packet received by network interface portion 105 is sent to packet relay processing portion 103. Packet information extracting portion 201 of MPLS policy routing processing portion 104 receives the sent packet. The packet comprises packet information. Packet information comprises layer information related to each layer of the OSI 7-layer model. Packet information extracting portion 201 extracts this packet information included in the packet, and sends this to policy condition determining portion 202 inside MPLS policy routing processing controller 205. Further, packet information extracting portion 201 sends the DIP comprised in an IP header within the packet information to FEC table reference controller 206 inside MPLS routing processing controller 210. Further, packet information extracting portion 201 sends the received packet to label attaching/converting controller 212.

1-2. MPLS Policy Routing Processing Controller 205

Policy condition determining portion 202 of MPLS policy routing processing controller 205 receives packet information from packet information extracting portion 201. Policy condition determining portion 202 uses the received packet information as a key and retrieves policy conditions stored in policy condition storage portion 214 to make a determination as to whether or not to execute MPLS policy routing functions.

Policy condition storage portion 214 stores layer information related to each layer of the OSI 7-layer model, which constitutes policy conditions for performing MPLS policy routing. FIG. 4 shows the contents of policy conditions stored by policy condition storage portion 214. As shown in FIG. 4, policy conditions comprise policy condition No. 401, and layer information 402 to 408 related to OSI Layer 1 through Layer 7. In actuality, layer information stored correspondent to each policy condition number 401 is layer information related to one or more layers within OSI Layer 1 through Layer 7.

In FIG. 4, OSI Layer 1 information 402, for example, is information related to the above-mentioned circuit media, or information such as a circuit port number and apparatus number. OSI Layer 2 information 403 is information, such as a destination/source MAC (Media Access Control) address, VLAN (Virtual LAN)—ID and the like. OSI Layer 3 information 404 is QoS (Quality of Service) information (IP header TOS (Type of Service) field value), DIP, source IP address (hereinafter referred to as SIP). OSI Layer 4 information 405 is UDP (User Datagram Protocol), TCP (Transmission Control Protocol) destination/source port numbers and the like. OSI Layer 5 information 406, OSI Layer 6 information 407 and OSI Layer 7 information 408 is information related to each of the respective layers. The respective layer information 402 through 408 can comprise one or more items of the specific information mentioned hereinabove.

Policy condition determining portion 202 determines if any of the information within the received packet matches any of the layer information 402 through 408 stored in policy condition storage portion 214. When any information within the packet information matches any layer information, policy condition determining portion 202 reads out the policy condition No. 401 correspondent to this layer information. Policy condition determining portion 202 notifies the read-out policy condition No. 401 to policy condition—label conversion table reference controller 203. When none of the information within the packet information matches any layer information, policy condition determining portion 202 notifies the policy condition—label conversion table reference controller 203 to the effect that there are no policy conditions. More specifically, policy condition determining portion 202 sends a signal to policy condition—label conversion table reference controller 203 indicating there are no policy conditions.

When policy condition—label conversion table reference controller 203 receives notification that there are no policy conditions, it notifies applicable convention selecting portion 211 that there is no need for MPLS policy control. When a policy condition No. 401 is received, policy condition—label conversion table reference controller 203 retrieves a policy condition—label conversion table 204 using this policy condition No. 401.

Figure 5:
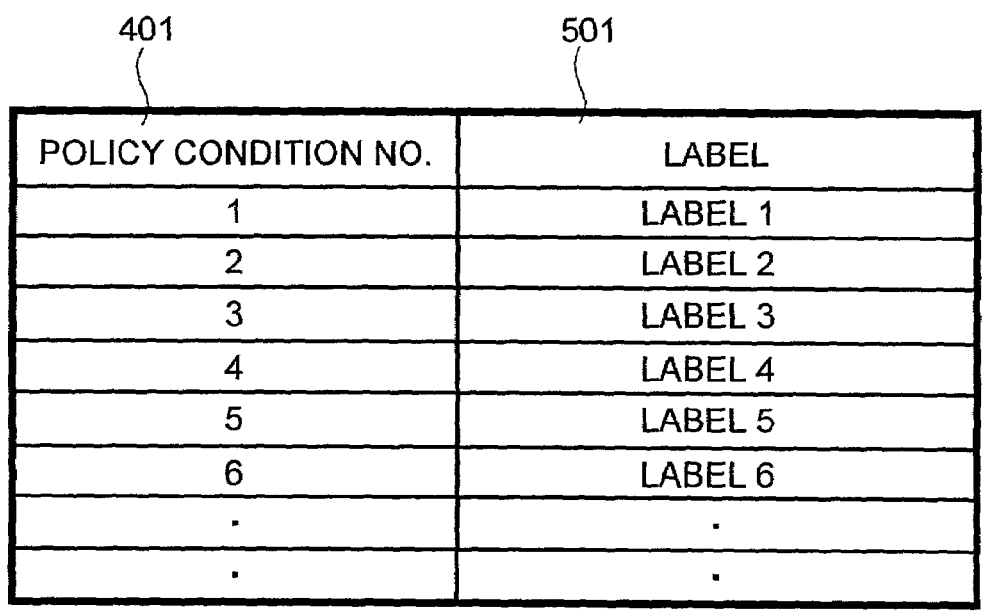
FIG. 5 shows an example of the constitution of a policy condition—label conversion table.

FIG. 5 shows an example of the constitution of policy condition—label conversion table 204. Policy condition—label conversion table 204 has a plurality of entries. As shown in FIG. 5, in each entry, a policy condition No. 401 is stored correspondent to the value of a label 501 determined for each LSP. The value of a label 501, for example, is any of Label1 through Label6.

Policy condition—label conversion table reference controller 203 retrieves the policy condition No. 401, which matches the value of the received policy condition No. 401. When a policy condition No. 401, which matches the value of the received policy condition No. 401, is found in policy condition—label conversion table 204, policy condition—label conversion table reference controller 203 reads out the value of a label 501 corresponding to this policy condition No. 401. Policy condition—label conversion table reference controller 203 notifies the applicable convention selecting portion 211 of the read-out label 501 value. When it is not possible to find a policy condition No. 401 matching the value of the received policy condition No. 401, policy condition—label conversion table reference controller 203 notifies applicable convention selecting portion 211 that there is no need for MPLS policy control. More specifically, policy condition—label conversion table reference controller 203 sends a signal to applicable convention selecting portion 211 indicating that there is no need for MPLS policy control (the same holds true hereinbelow).

1-3. MPLS Routing Processing Controller 210

FEC table reference controller 206 inside MPLS routing processing controller 210 receives a DIP from packet information extracting portion 201. FEC table reference controller 206 retrieves an FEC table 207 using the received DIP.

Figure 6:
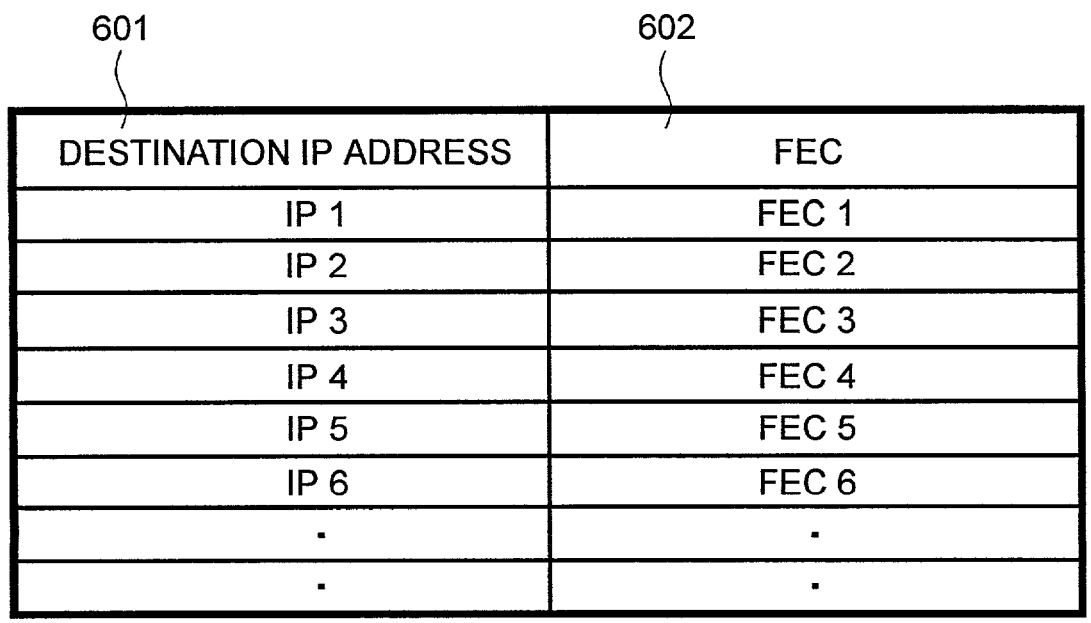
FIG. 6 shows an example of the constitution of an FEC table.

FIG. 6 shows an example of the constitution of FEC table 207. FEC table 207 comprises a plurality of entries. As shown in FIG. 6, in each entry, an FEC 602 is registered correspondent to a destination IP address 601. A destination IP address 601, for example, is any of DIP1 through DIP6. Further, the value of FEC 602 is any of FEC1 through FEC6. As explained hereinabove, the respective values of FEC 602 correspond to each LSP.

FEC table reference controller 206 retrieves a destination IP address 601, which matches the received DIP. When a destination IP address 601 matching the received DIP is found, FEC table reference controller 206 reads out from FEC table 207 the value of the FEC 602 corresponding to this destination IP address 601. FEC table reference controller 206 notifies FEC—label conversion table reference controller 208 of the value of the read-out FEC 602. When there is no destination IP address 601 matching the received DIP, FEC table reference controller 206 notifies FEC—label conversion table reference controller 208 that there is no FEC. More specifically, it sends a signal to FEC—label conversion table reference controller 208 indicating that there is no FEC.

When FEC—label conversion table reference controller 208 receives notification from FEC table reference controller 206 that there is no FEC, it notifies applicable convention selecting portion 211 that there is no need for MPLS routing processing control. When it receives a value of an FEC 602, FEC—label conversion table reference controller 208 retrieves an FEC—label conversion table 209 using the value of the received FEC 602.

Figure 7:
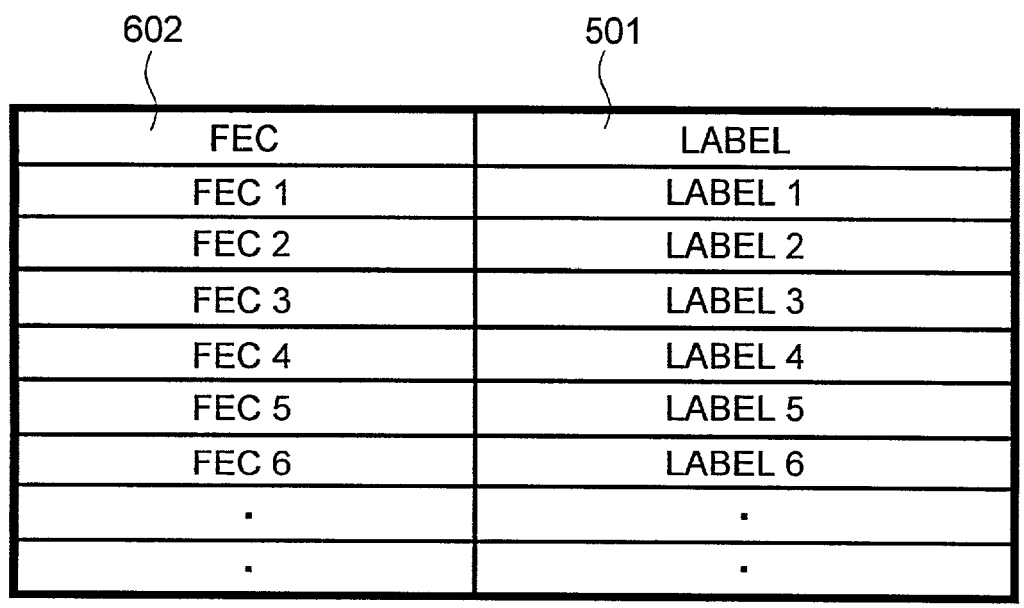
FIG. 7 shows an example of the constitution an FEC—label conversion table.

FIG. 7 shows an example of the constitution of FEC—label conversion table 209. FEC—label conversion table 209 comprises a plurality of entries. As shown in FIG. 7, in each entry, a label 501 is registered correspondent to an FEC 602. As explained hereinabove, the value of each FEC 602 corresponds to each LSP. Further, the value of each of label 501 is the value determined for each LSP.

FEC—label conversion table reference controller 208 retrieves an FEC 602, which matches the received FEC 602 value. When an FEC 602 matching the value of the received FEC 602 is found, FEC—label conversion table reference controller 208 reads out the value of a label 501 corresponding to this FEC 602 from FEC—label conversion table 209. FEC—label conversion table reference controller 208 notifies applicable convention selecting portion 211 of the value of the read-out label 501. When an FEC 602 matching the value of the received FEC 602 cannot be found, FEC—label conversion table reference controller 208 notifies applicable convention selecting portion 211 that there is no need for MPLS routing processing control.

1-4. Applicable Convention Selecting Portion 211

Applicable convention selecting portion 211 receives notifications from policy condition—label conversion table reference controller 203 and FEC—label conversion table reference controller 208, and determines whether it should execute MPLS policy routing control, MPLS routing control, or IP routing control.

Figure 8:
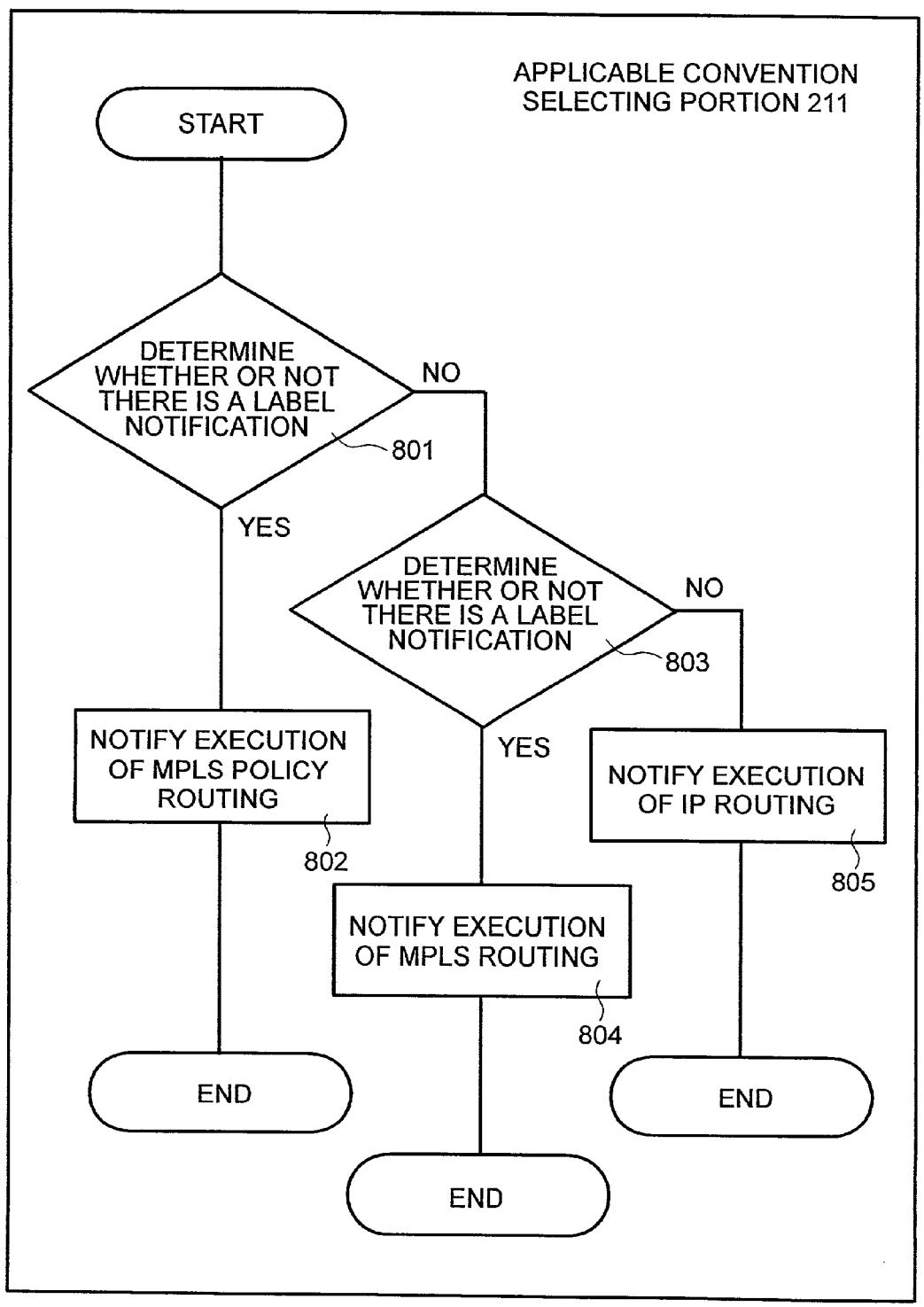
FIG. 8 shows the processing procedure of the applicable convention selecting portion.

FIG. 8 shows the determination processing procedure of applicable convention selecting portion 211.

First, applicable convention selecting portion 211 determines whether or not a label 501 notification has been received from policy condition—label conversion table reference controller 203 of MPLS policy routing processing controller 205 (Step 801). When a label 501 has been received from policy condition—label conversion table reference controller 203 (YES), applicable convention selecting portion 211 notifies label attaching/converting controller 212 to the effect that MPLS policy routing control is to be executed (Step 802). More specifically, applicable convention selecting portion 211 sends a signal to label attaching/converting controller 212 indicating that MPLS policy routing control is to be executed (the same holds true hereinbelow). When a notification to the effect that MPLS policy routing control is not necessary is received from policy condition—label conversion table reference controller 203 (NO), applicable convention selecting portion 211 makes a determination as to whether or not a label 501 notification has been received from FEC—label conversion table reference controller 208 of MPLS routing processing controller 210 (Step 803). When a label 501 has been received from FEC—label conversion table reference controller 208 (YES), applicable convention selecting portion 211 notifies label attaching/converting controller 212 to the effect that MPLS routing control is to be executed (Step 804). When a notification to the effect that MPLS routing control is not necessary is received from FEC—label conversion table reference controller 208 (NO), applicable convention selecting portion 211 notifies label attaching/converting controller 212 to the effect that IP routing control is to be executed (Step 805). In either Step 802 or Step 804, applicable convention selecting portion 211 also sends the received label 501 to label attaching/converting controller 212.

1-5. Label Attaching/Converting Controller 212

Label attaching/converting controller 212 receives a packet from packet information extracting portion 201. Further, when a notification to the effect that MPLS policy routing control is to be executed, and a label 501 are received from applicable convention selecting portion 211, label attaching/converting controller 212 attaches the received label to the received packet, and sends the received packet to packet transmitting portion 213.

Further, when a notification to the effect that MPLS routing control is to be executed, and a label 501 are received from applicable convention selecting portion 211, label attaching/converting controller 212 attaches the received label to the received packet, and sends the received packet to packet transmitting portion 213.

When a notification to the effect that IP routing control is to be executed is received from applicable convention selecting portion 211, label attaching/converting controller 212 sends the received packet to packet transmitting portion 213. In this case, packet relay processing portion 103 decides the routing destination of a packet received from network interface portion 105. Packet relay processing portion 103 sends this packet to data transmitting portion 102 in accordance with the decided routing destination.

1-6. Packet Transmitting Portion 213

Packet transmitting portion 213 receives a packet from label attaching/converting controller 212. Packet transmitting portion 213 sends the received packet to data transmitting portion 102 in accordance with the value of the label attached to the packet. When a label is not attached to the packet, packet transmitting portion 213 delivers the packet to packet relay processing portion 103. In this case, packet relay processing portion 103 decides the routing destination of this packet. Packet relay processing portion 103 sends this packet to data transmitting portion 102 in accordance with the decided routing destination.

The packet is sent to packet relay processing portion 106 by data transmitting portion 102. Packet relay processing portion 106 sends the packet received from data transmitting portion 102 to network interface portion 107 in accordance with the label value. Network interface portion 107 receives the packet from packet relay processing portion 106, and sends the packet to the LSP corresponding to the label value.

When a label is not attached to the packet, packet relay processing portion 106 and network interface portion 107, respectively, send out the packet according to the packet information included in the packet.

2. When an Internetwork Apparatus Operates as a Core Internetwork Apparatus 2-1. Packet Information Extracting Portion 201

A packet received by network interface portion 105 is sent to packet relay processing portion 103. Packet information extracting portion 201 of MPLS policy routing processing portion 104 receives the sent packet. Packet information extracting portion 201 determines whether a label is attached to the received packet. When a label is attached to the packet, packet information extracting portion 201 sends this packet to label attaching/converting controller 212, and terminates processing. When a label is not attached to the packet, packet information extracting portion 201 executes the same operation as that described in 1-1. Thus, an explanation of that operation will be omitted.

2-2. MPLS Policy Routing Processing Controller 205

When packet information is received from packet information extracting portion 201, MPLS policy routing processing controller 205 executes the operation described in 1-2.

2-3. MPLS Routing Processing Controller 210

When a DIP is received from packet information extracting portion 201, MPLS routing processing controller 210 executes the same operation as that described in 1-3.

2-4. Applicable Convention Selecting Portion 211

When a notification is received from either policy condition—label conversion table reference controller 203 or FEC—label conversion table reference controller 208, applicable convention selecting portion 211 executes the operation described in 1-4.

2-5. Label Attaching/Converting Controller 212

Label attaching/converting controller 212 receives a packet from packet information extracting portion 201. As explained hereinabove, label attaching/converting controller 212 makes the value of a label received from another internetwork apparatus correspondent to the value of a label, which its own internetwork apparatus decided, and stores them for each LSP. When a label is attached to a received packet, label attaching/converting controller 212 identifies the LSP corresponding to this label value. In this case, the value of the label attached to the received packet is the same as the value of the label, which its own internetwork apparatus assigned to this LSP. Label attaching/converting controller 212 determines whether or not the value of another label, which is stored correspondent to the value of this label, is the same. The value of the other label in this case is the value of a label assigned to this LSP by another internetwork apparatus. When the values of the two labels differ, label attaching/converting controller 212 converts the value of the label attached to the received packet to the value of the other label stored correspondent to this label. And then, label attaching/converting controller 212 sends the packet having the converted label to packet transmitting portion 213. Further, if the values of the two labels are the same, label attaching/converting controller 212 sends the received packet to packet transmitting portion 213.

If the value of a label attached to a received packet does not match any stored label values, label attaching/converting controller 212 discards this packet and terminates processing. In this case, this packet is either a packet, which generated an error, or is a packet, which should be routed by another Core internetwork apparatus.

When a packet that is not attached with a label is received, label attaching/converting controller 212 executes the same operation as that described in 1-5.

2-6. Packet Transmitting Portion 213

Packet transmitting portion 213 receives a packet from label attaching/converting controller 212, and executes the same operation as that described in 1-6.

3. When an Internetwork Apparatus Operates as an Egress Internetwork Apparatus 3-1. Packet Information Extracting Portion 201

Packet information extracting portion 201 receives a packet from network interface portion 105, and executes the operation described in 2-1.

3-2. MPLS Policy Routing Processing Controller 205

MPLS policy routing processing controller 205 executes the operation described in 1-2.

3-3. MPLS Routing Processing Controller 210

MPLS routing processing controller 210 executes the same operation as that described in 1-3.

3-4. Applicable Convention Selecting Portion 211

Applicable convention selecting portion 211 executes the operation described in 1-4.

3-5. Label Attaching/Converting Controller 212

Label attaching/converting controller 212 receives a packet from packet information extracting portion 201. When a label is attached to the received packet, label attaching/converting controller 212 identifies the LSP corresponding to the value of this label. Then, label attaching/converting controller 212 deletes the label attached to the packet, and sends this packet to packet transmitting portion 213.

The operation of label attaching/converting controller 212 in other cases is the same as the operation described in 2-5.

3-6. Packet Transmitting Portion 213

Packet transmitting portion 213 receives a packet from label attaching/converting controller 212, and executes the same operation as that described in 1-6.

Figure 3:
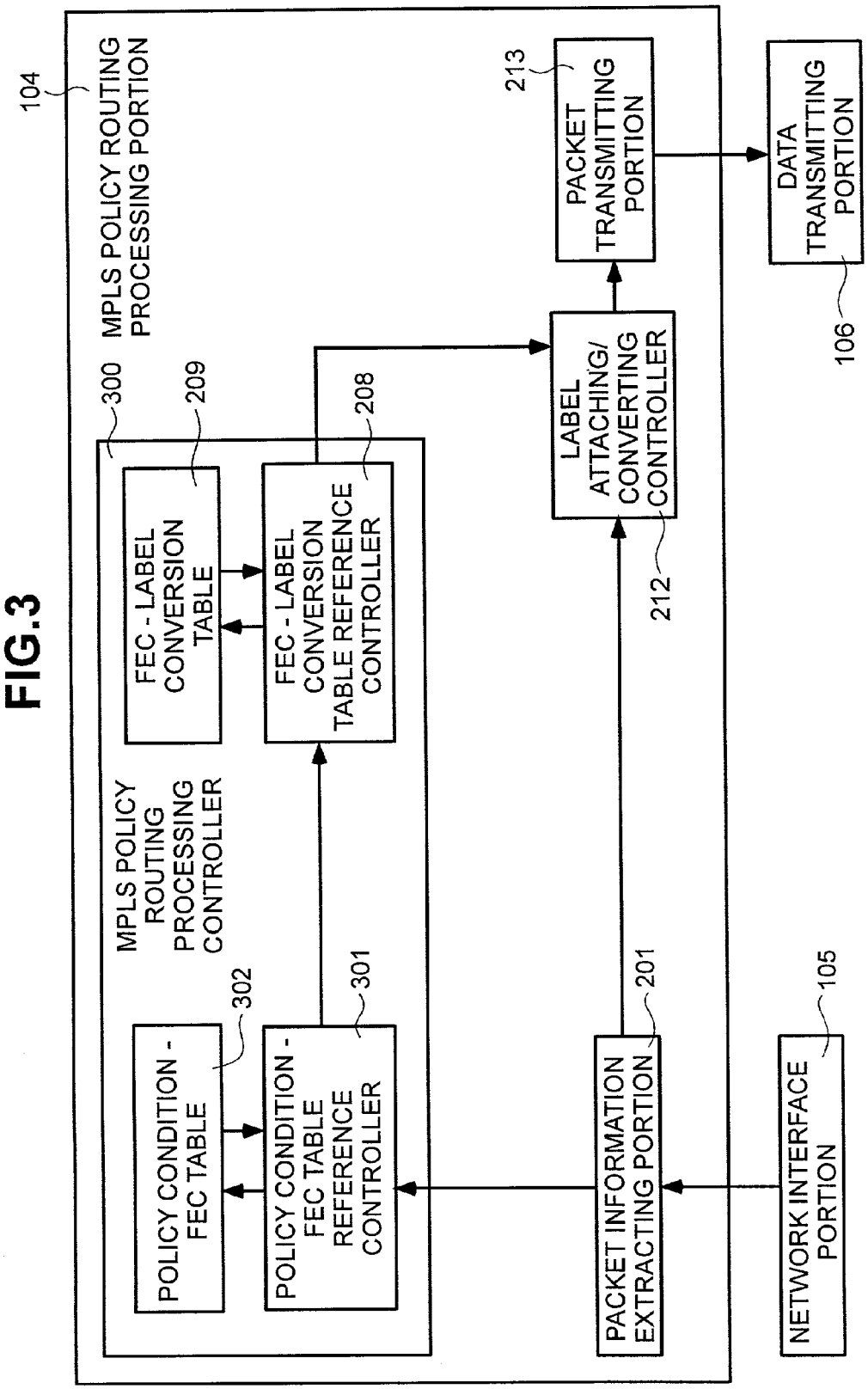
FIG. 3 shows another example of an internal structure of an MPLS policy routing processing portion.

FIG. 3 shows an example of another internal structure of MPLS policy routing processing portion 104. However, the same reference numerals are assigned to constituents that are the same as those of MPLS policy routing processing portion 104 shown in FIG. 2.

In this example, MPLS policy routing processing portion 104 includes packet information extracting portion 201, MPLS policy routing processing controller 300, label attaching/converting controller 212, and packet transmitting portion 213. MPLS policy routing processing controller 300 is constituted from policy condition—FEC table reference controller 301, policy condition—FEC table 302, FEC—label conversion table reference controller 208, and FEC—label conversion table 209. Further, MPLS policy routing processing controller 300 comprises memory not shown in the figure. Policy condition—FEC table 302 and FEC—label conversion table 209 are stored in this memory.

Next, the operation of MPLS policy routing processing portion 104 shown in FIG. 3 will be explained in order with regard to when an internetwork apparatus is an Ingress internetwork apparatus, a Core internetwork apparatus, or an Egress internetwork apparatus.

4. When an Internetwork Apparatus Operates as an Ingress Internetwork Apparatus 4-1. Packet Information Extracting Portion 201

Packet information extracting portion 201 receives a packet sent from network interface portion 105. The packet comprises packet information (layer information) related to each layer of the OSI 7-layer model. Packet information extracting portion 201 extracts this packet information included in the packet, and sends this packet information to policy condition—FEC table reference controller 301 of MPLS policy routing processing controller 300. Further, packet information extracting portion 201 sends the received packet to label attaching/converting controller 212.

4-2. MPLS Policy Routing Processing Controller 300

Policy condition—FEC table reference controller 301 of MPLS policy routing processing controller 300 receives packet information from packet information extracting portion 201. Policy condition—FEC table reference controller 301 retrieves policy condition—FEC table 302 using the received packet information as a key.

FIG. 9 shows an example of the constitution of policy condition—FEC table 302. Policy condition—FEC table 302 comprises a plurality of entries. As shown in FIG. 9, each entry is stored correspondent to a policy condition No. 401, layer information 402 to 408 related to OSI Layer 1 through Layer 7, and an FEC 602. Layer information corresponding to each policy condition No. 401 is layer information related to any of at the least one or more layers within OSI Layer 1 through Layer 7. As explained hereinabove, the value of each FEC 602 corresponds to each LSP. Policy condition No. 401 and the respective layer information 402 to 408, which are included in policy condition—FEC table 302, are the same as the policy conditions stored by policy condition storage portion 12 shown in FIG. 4. That is, policy condition—FEC table 302 is stored by making policy conditions and FEC 602 correspondent.

Policy condition—FEC table reference controller 301 determines whether any information within the received packet information matches any layer information 402 to 408 of policy condition—FEC table 302. When any information within the packet information matches any layer information, policy condition—FEC table reference controller 301 reads out the value of the FEC 602 corresponding to that layer information from policy condition—FEC table 302. Policy condition—FEC table reference controller 301 notifies FEC—label conversion table reference controller 208 of the value of the readout FEC 602. When none of the information within the packet information matches with any of the layer information, policy condition—FEC table reference controller 301 notifies FEC—label conversion table reference controller 208 that there is no FEC. More specifically, it sends a signal to FEC—label conversion table reference controller 208 indicating there is no FEC.

When FEC—label conversion table reference controller 208 receives a notification from policy condition—FEC table reference controller 301 that there is no FEC, it notifies label attaching/converting controller 212 to the effect that IP routing control will be executed. More specifically, it sends a signal to label attaching/converting controller 212 indicating the execution of IP routing control (the same holds true hereinbelow). Upon receiving an FEC 602 value, FEC—label conversion table reference controller 208 retrieves FEC—label conversion table 209 using the value of the received FEC 602.

FEC—label conversion table 209 is the same as that shown in FIG. 7.

FEC—label conversion table reference controller 208 searches for an FEC 602 that matches the value of the received FEC 602. When an FEC 602 matching the value of the received FEC 602 is found, FEC—label conversion table reference controller 208 reads out the value of the label 501 corresponding to this FEC 602 from FEC—label conversion table 209. FEC—label conversion table reference controller 208 notifies label attaching/converting controller 212 of the value of the read-out label 501. When an FEC 602 matching the value of the received FEC 602 is not found, FEC—label conversion table reference controller 208 notifies label attaching/converting controller 212 to the effect that IP routing control will be executed.

4-3. Label Attaching/Converting Controller 212

Label attaching/converting controller 212 receives a packet from packet information extracting portion 201. Further, upon receiving a label 501 from FEC—label conversion table reference controller 208, label attaching/converting controller 212 attaches the received label to the received packet, and sends the received packet to packet transmitting portion 213. Further, when a notification to the effect that IP routing control will be executed is received from FEC—label conversion table reference controller 208, label attaching/converting controller 212 sends the received packet to packet transmitting portion 213. In this case, packet relay processing portion 103 decides the routing destination of a packet received from network interface portion 105. Packet relay processing portion 103 sends this packet to data transmitting portion 102 in accordance with the decided routing destination.

4-4. Packet Transmitting Portion 213

Packet transmitting portion 213 receives a packet from label attaching/converting controller 212, and executes the same operation as that described in 1-6.

5. When an Internetwork Apparatus Operates as a Core Internetwork Apparatus 5-1. Packet Information Extracting Portion 201

Packet information extracting portion 201 receives a packet sent from network interface portion 105. Packet information extracting portion 201 determines whether or not a label is attached to the received packet. When a label is attached to the packet, packet information extracting portion 201 sends this packet to label attaching/converting controller 212 and terminates processing. When a label is not attached to the packet, packet information extracting portion 201 executes the same operation as that described in 4-1.

5-2. MPLS Policy Routing Processing Controller 300

When packet information is received from packet information extracting portion 201, MPLS policy routing processing controller 300 executes the operation described in 4-2.

5-3. Label Attaching/Converting Controller 212

Label attaching/converting controller 212 receives a packet from packet information extracting portion 201, and executes the same operation as that described in 2-5.

5-4. Packet Transmitting Portion 213

Packet transmitting portion 213 receives a packet from label attaching/converting controller 212, and executes the same operation as that described in 1-6.

6. When an Internetwork Apparatus Operates as an Egress Internetwork Apparatus 6-1. Packet Information Extracting Portion 201

Packet information extracting portion 201 receives a packet from network interface portion 105, and executes the operation described in 5-1.

6-2. MPLS Policy Routing Processing Controller 300

MPLS policy routing processing controller 300 executes the operation described in 4-2.

6-3. Label Attaching/Converting Controller 212

Label attaching/converting controller 212 receives a packet from packet information extracting portion 201, and executes the same operation as that described in 3-5.

6-4. Packet Transmitting Portion 213

Packet transmitting portion 213 receives a packet from label attaching/converting controller 212, and executes the same operation as that described in 1-6.

Next, an example of an MPLS network, in which the above-mentioned internetwork apparatus is arranged, will be explained.

Figure 10:
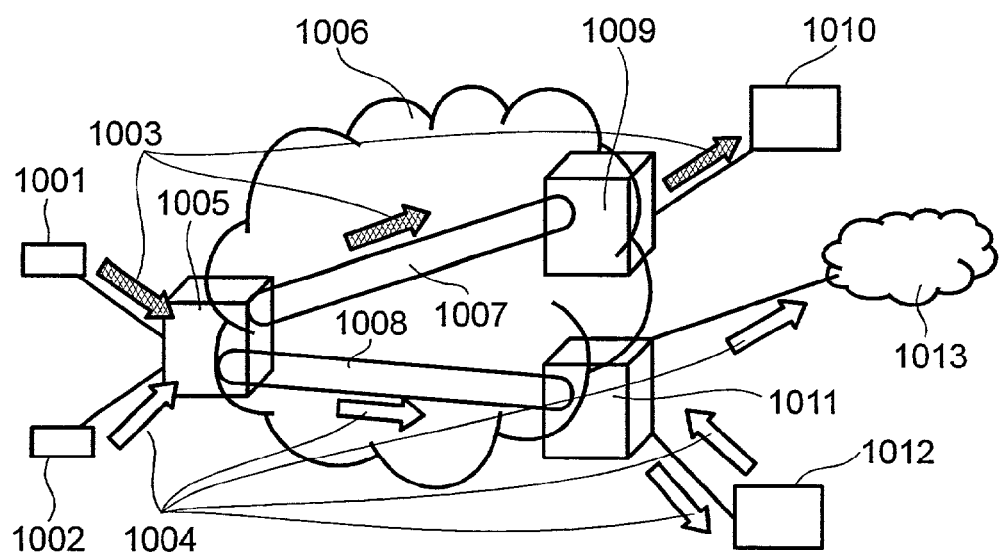
FIG. 10 shows an example of one constitution of an MPLS network system.

FIG. 10 shows an example of one constitution of an MPLS network.

In FIG. 10, an internetwork apparatus 1005, an internetwork apparatus 1009, and an internetwork apparatus 1011 are arranged in an intranet 1006. Internetwork apparatus 1005 is connected to internetwork apparatus 1009 and internetwork apparatus 1011. These internetwork apparatus constitute an MPLS network. An LSP 1007 is established between internetwork apparatus 1005 and internetwork apparatus 1009. Further, an LSP 1008 is established between internetwork apparatus 1005 and internetwork apparatus 1011. Internetwork apparatus 1005 is connected to a user device 1001 and a user device 1002. User device 1001 is not authorized to access a network outside of the intranet. User device 1002 is authorized to access a network outside of the intranet. Internetwork apparatus 1009 is connected to a Web server 1010. Web server 1010 is accessed only by devices inside the intranet. Internetwork apparatus 1011 is connected to a Web server 1012. Web server 1012 is accessed by devices inside the intranet and outside of the intranet. Further, internetwork apparatus 1011 is also connected to the Internet 1013.

Internetwork apparatus 1005 receives a packet from either user device 1001 or user device 1002, and routes this packet to another internetwork apparatus using either LSP 1007 or LSP 1008. Therefore, internetwork apparatus 1005 operates as an Ingress internetwork apparatus. Internetwork apparatus 1009 receives a packet from LSP 1007, and routes this packet to Web server 1010. Further, internetwork apparatus 1011 receives a packet from LSP 1008, and routes this packet to either Web server 1012 or the Internet 1013. Therefore, internetwork apparatus 1009 and internetwork apparatus 1011 both operate as Egress internetwork apparatus. Arrows 1003 show the flow of a packet sent from user device 1001. Arrows 1004 show the flow of a packet sent from user device 1002.

When Ingress internetwork apparatus 1005 comprises MPLS policy routing processing portion 104 shown in FIG. 2, Ingress internetwork apparatus 1005 operates as follows.

Policy condition storage portion 214 of MPLS policy routing processing portion 104, as shown in FIG. 4, stores layer information "SIP1" related to OSI Layer 3 correspondent to policy condition No. "1". Further, policy condition storage portion 214, as shown in FIG. 4, stores layer information "SIP2" related to OSI Layer 3 correspondent to policy condition No. "2". "SIP1" is the IP address assigned to user device 1001. Further, "SIP2" is the IP address assigned to user device 1002.

One entry of policy condition—label conversion table 204 of MPLS policy routing processing portion 104, as shown in FIG. 5, stores "Label1" correspondent to policy condition No. "1". Further, another entry of policy condition—label conversion table 204 stores "Lable2" correspondent to policy condition No. "2". "Label1" is the value of the label of LSP 1007. "Label2" is the value of the label of LSP 1008.

For example, when a packet is sent from user device 1001, the packet has packet information comprising the source IP address "SIP1". When Ingress internetwork apparatus 1005 receives this packet, MPLS policy routing processing controller 204 of MPLS policy routing processing portion 104 operates as described in 1-2. In this case, policy condition determining portion 202 recognizes that source IP address "SIP1" in the packet information matches layer information "SIP1" stored in policy condition storage portion 214. Policy condition determining portion 202 reads out policy condition No. "1" corresponding to "SIP1" from policy condition storage portion 214, and notifies policy condition—label conversion table reference controller 203. Policy condition—label conversion table reference controller 203 finds policy condition No. "1" in policy condition—label conversion table 204, reads out "Label1" corresponding to policy condition No. "1" from policy condition—label conversion table 204, and notifies applicable convention selecting portion 211.

As described in 1-4 and 1-5, "Label1" is sent to label attaching/converting controller 212, and is attached to a received packet. Accordingly, as described in 1-6, Ingress internetwork apparatus 1005 transmits the packet to LSP 1007. In this case, Egress internetwork apparatus 1009 receives the packet from LSP 1007, and operates as described in 3-1 through 3-6. That is, Egress internetwork apparatus 1009 deletes "Label1" from the packet. Then, Egress internetwork apparatus 1009 sends the packet to Web server 1010 in accordance with the packet information.

Conversely, when a packet is sent from user device 1002, the packet has packet information comprising the source IP address "SIP2". When Ingress internetwork apparatus 1005 receives this packet, policy condition determining portion 202 finds layer information "SIP2" stored in policy condition storage portion 214, reads out policy condition No. "2" corresponding to "SIP2" from policy condition storage portion 214, and notifies policy condition—label conversion table reference controller 203. Policy condition—label conversion table reference controller 203 finds policy condition No. "2" in policy condition—label conversion table 204, reads out "Label2" corresponding to policy condition No. "2" from policy condition—label conversion table 204, and notifies applicable convention selecting portion 211.

"Label2" is sent to label attaching/converting controller 212, and is attached to a received packet. Accordingly, Ingress internetwork apparatus 1005 transmits the packet to LSP 1008. In this case, Egress internetwork apparatus 1011 receives the packet from LSP 1008, and operates as described in 3-1 through 3-6. That is, Egress internetwork apparatus 1011 deletes "Label2" from the packet. Then, Egress internetwork apparatus 1011 sends the packet to either Web server 1012 or the Internet 1013 in accordance with the packet information.

When Ingress internetwork apparatus 1005 comprises MPLS policy routing processing portion 104 shown in FIG. 3, Ingress internetwork apparatus 1005 operates as follows.

One entry of policy condition—FEC table 302 of MPLS policy routing processing portion 104, as shown in FIG. 9, stores "FEC1" correspondent to policy condition No. "1" and layer information "SIP1" related to OSI Layer 3. Further, another entry of policy condition—FEC table 302 stores "FEC2" correspondent to policy condition No. "2" and layer information "SIP2" related to OSI Layer 3. "FEC1" corresponds to LSP 1007. Further, "FEC2" corresponds to LSP 1008.

One entry of FEC—label conversion table 209 of MPLS policy routing processing portion 104, as shown in FIG. 7, stores "Label1" correspondent to "FEC1". Further, another entry of FEC—label conversion table 209 stores "Label2" correspondent to "FEC2".

As explained hereinabove, Ingress internetwork apparatus 1005 receives a packet sent from user device 1001. In Ingress internetwork apparatus 1005, MPLS policy routing processing controller 300 of MPLS policy routing processing portion 104 operates as described in 4-2. In this case, policy condition—FEC table reference controller 301 recognizes that source IP address "SIP1" in the packet information matches layer information "SIP1" in policy condition—FEC table 302. Policy condition—FEC table reference controller 301 reads out "FEC1" corresponding to "SIP1" from policy condition—FEC table 302, and notifies FEC—label conversion table reference controller 208. FEC—label conversion table reference controller 208 finds "FEC1" in FEC—label conversion table 209, reads out "Label1" corresponding to "FEC1" from FEC—label conversion table 209, and notifies label attaching/converting controller 212.

As described in 4-3 and 4-4, "Label1" is attached to a received packet. Accordingly, Ingress internetwork apparatus 1005 transmits the packet to LSP 1007.

Conversely, Ingress internetwork apparatus 1005 receives a packet sent from user device 1002. In Ingress internetwork apparatus 1005, policy condition—FEC table reference controller 301 finds layer information "SIP2" in policy condition—FEC table 302, reads out "FEC2" corresponding to "SIP2" from policy condition—FEC table 302, and notifies FEC—label conversion table reference controller 208. FEC—label conversion table reference controller 208 finds "FEC2" in FEC—label conversion table 209, reads out "Label2" corresponding to "FEC2" from FEC—label conversion table 209, and notifies label attaching/converting controller 212.

"Label2" is attached to a received packet. Accordingly, Ingress internetwork apparatus 1005 transmits the packet to LSP 1008.

Figure 11:
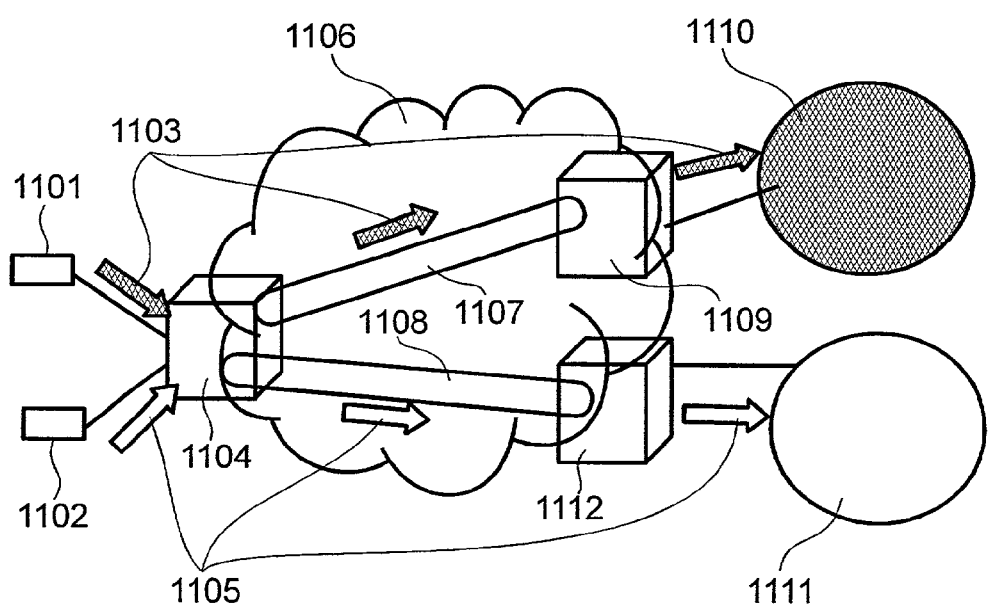
FIG. 11 shows an example of another constitution of an MPLS network system.

FIG. 11 shows an example of another constitution of an MPLS network.

In FIG. 11, an MPLS network 1006 comprises an internetwork apparatus 1104, an internetwork apparatus 1109 and an internetwork apparatus 1112. An LSP 1107 is established between internetwork apparatus 1104 and internetwork apparatus 1109. Further, an LSP 1108 is established between internetwork apparatus 1104 and internetwork apparatus 1112. Internetwork apparatus 1104 is connected to a user device 1101 and a user device 1102. User device 1101 is assigned VLAN-ID "VLAN1". User device 1102 is assigned VLAN-ID "VLAN2". Internetwork apparatus 1109 is connected to a VPN (Virtual Private Network) site. VPN 1110 is assigned VPN-ID "VPN1". User device 1101 belongs to VPN site 1110, and communicates with other devices of VPN site 1110. Internetwork apparatus 1112 is connected to a VPN site 1111. VPN 1111 is assigned VPN-ID "VPN2". User device 1102 belongs to VPN site 1111, and communicates with other devices of VPN site 1111.

Internetwork apparatus 1104 receives a packet from either user device 1101 or user device 1102, and routes this packet to another internetwork apparatus using either LSP 1107 or LSP 1108. Therefore, internetwork apparatus 1104 operates as an Ingress internetwork apparatus. Internetwork apparatus 1109 receives a packet from LSP 1107, and routes this packet to VPN site 1110. Further, internetwork apparatus 1112 receives a packet from LSP 1108, and routes this packet to VPN site 1111. Therefore, internetwork apparatus 1109 and internetwork apparatus 1112 both operate as Egress internetwork apparatus. Arrows 1103 show the flow of a packet sent from user device 1101. Arrows 1105 show the flow of a packet sent from user device 1102.

When Ingress internetwork apparatus 1104 comprises MPLS policy routing processing portion 104 shown in FIG. 2, Ingress internetwork apparatus 1104 operates as follows.

Policy condition storage portion 214 of MPLS policy routing processing portion 104, as shown in FIG. 4, stores layer information "MAC1" and "VLAN1" related to OSI Layer 2 correspondent to policy condition No. "3". Further, policy condition storage portion 214 stores layer information "MAC2" and "VLAN2" related to OSI Layer 2 correspondent to policy condition No. "4". "MAC1" is the MAC address of user device 1101. Further, "MAC2" is the MAC address assigned to user device 1102.

One entry of policy condition—label conversion table 204 of MPLS policy routing processing portion 104, as shown in FIG. 5, stores "Label3" correspondent to policy condition No. "3". Further, another entry of policy condition—label conversion table 204 stores "Lable4" correspondent to policy condition No. "4". "Label3" is the value of the label of LSP 1107. "Label4" is the value of the label of LSP 1108.

For example, when a packet is sent from user device 1101, the packet has packet information comprising the source MAC address "MAC1" and VLAN-ID "VLAN1". When Ingress internetwork apparatus 1104 receives this packet, MPLS policy routing processing controller 204 of MPLS policy routing processing portion 104 operates as described in 1-2. In this case, policy condition determining portion 202 recognizes that either source MAC address "MAC1" or VLAN-ID "VLAN1" in the packet information matches either layer information "MAC1" or "VLAN1" stored in policy condition storage portion 214. Policy condition determining portion 202 reads out policy condition No. "3" corresponding to the matching layer information from policy condition storage portion 214, and notifies policy condition—label conversion table reference controller 203. Policy condition—label conversion table reference controller 203 finds policy condition No. "3" in policy condition—label conversion table 204, reads out "Label3" corresponding to policy condition No. "3" from policy condition—label conversion table 204, and notifies applicable convention selecting portion 211.

As described in 1-4 and 1-5, "Label3" is sent to label attaching/converting controller 212, and is attached to a received packet. Accordingly, as described in 1-6, Ingress internetwork apparatus 1104 transmits the packet to LSP 1107. In this case, Egress internetwork apparatus 1109 receives the packet from LSP 1107, and operates as described in 3-1 through 3-6. That is, Egress internetwork apparatus 1109 deletes "Label3" from the packet. Then, Egress internetwork apparatus 1109 sends the packet to VPN site 1110 in accordance with the packet information.

Conversely, when a packet is sent from user device 1102, the packet has packet information comprising the source MAC address "MAC2" and VLAN-ID "VLAN2". When Ingress internetwork apparatus 1104 receives this packet, policy condition determining portion 202 finds either layer information "MAC2" or "VLAN2" stored in policy condition storage portion 214, reads out policy condition No. "4" corresponding to layer information thereof from policy condition storage portion 214, and notifies policy condition—label conversion table reference controller 203. Policy condition—label conversion table reference controller 203 finds policy condition No. "4" in policy condition—label conversion table 204, reads out "Label4" corresponding to policy—condition No. "4" from policy condition—label conversion table 204, and notifies applicable convention selecting portion 211.

"Label4" is sent to label attaching/converting controller 212, and is attached to a received packet. Accordingly, Ingress internetwork apparatus 1104 transmits the packet to LSP 1108. In this case, Egress internetwork apparatus 1112 receives the packet from LSP 1108, and operates as described in 3-1 through 3-6. That is, Egress internetwork apparatus 1112 deletes "Label4" from the packet. Then, Egress internetwork apparatus 1112 sends the packet to VPN site 1111 in accordance with the packet information.

When Ingress internetwork apparatus 1104 comprises MPLS policy routing processing portion 104 shown in FIG. 3, Ingress internetwork apparatus 1104 operates as follows.

One entry of policy condition—FEC table 302 of MPLS policy routing processing portion 104, as shown in FIG. 9, stores "FEC3" correspondent to policy condition No. "3" and either layer information "MAC1" or "VLAN1" related to OSI Layer 2. Further, another entry of policy condition—FEC table 302 stores "FEC4" correspondent to policy condition No. "4" and either layer information "MAC2" or "VLAN2" related to OSI Layer 2. "FEC3" corresponds to LSP 1107. Further, "FEC4" corresponds to LSP 1108.

One entry of FEC—label conversion table 209 of MPLS policy routing processing portion 104, as shown in FIG. 7, stores "Label3" correspondent to "FEC3". Further, another entry of FEC—label conversion table 209 stores "Label4" correspondent to "FEC4".

As explained hereinabove, Ingress internetwork apparatus 1104 receives a packet sent from user device 1101. In Ingress internetwork apparatus 1104, MPLS policy routing processing controller 300 of MPLS policy routing processing portion 104 operates as described in 4-2. In this case, policy condition—FEC table reference controller 301 recognizes that either source MAC address "MAC1" or VLAN-ID "VLAN1" in the packet information matches either layer information "MAC1" or "VLAN1" in policy condition—FEC table 302. Policy condition—FEC table reference controller 301 reads out "FEC3" corresponding to either "MAC1" or "VLAN1" from policy condition—FEC table 302, and notifies FEC—label conversion table reference controller 208. FEC—label conversion table reference controller 208 finds "FEC3" in FEC—label conversion table 209, reads out "Label3" corresponding to "FEC3" from FEC—label conversion table 209, and notifies label attaching/converting controller 212.

As described in 4-3 and 4-4, "Label3" is attached to a received packet. Accordingly, Ingress internetwork apparatus 1104 transmits the packet to LSP 1107.

Conversely, Ingress internetwork apparatus 1104 receives a packet sent from user device 1102. Policy condition—FEC table reference controller 301 finds either layer information "MAC2" or "VLAN2" in policy condition—FEC table 302, reads out "FEC4" corresponding to this layer information from policy condition—FEC table 302, and notifies FEC—label conversion table reference controller 208. FEC—label conversion table reference controller 208 finds "FEC4" in FEC—label conversion table 209, reads out "Label4" corresponding to "FEC4" from FEC—label conversion table 209, and notifies label attaching/converting controller 212.

"Label4" is attached to a received packet. Accordingly, Ingress internetwork apparatus 1104 transmits the packet to LSP 1108.

In this example, VPN services are provided by MPLS network 1106.

Figure 12:
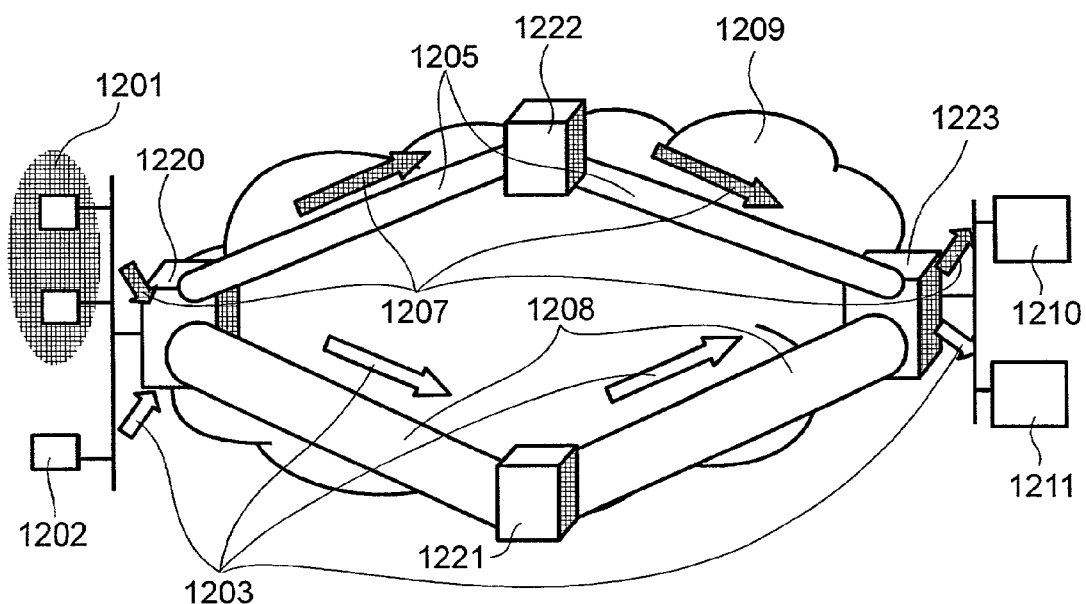
FIG. 12 shows an example of another constitution of an MPLS network system.

FIG. 12 shows an example of another constitution of an MPLS network.

In FIG. 12, an MPLS network 1209 comprises an internetwork apparatus 1220, an internetwork apparatus 1221, an internetwork apparatus 1222, and an internetwork apparatus 1223. An LSP 1205 is established between internetwork apparatus 1220, internetwork apparatus 1222, and internetwork apparatus 1223. Further, an LSP 1208 is established between internetwork apparatus 1220, internetwork apparatus 1221, and internetwork apparatus 1223. Internetwork apparatus 1220 is connected to a plurality of user devices 1201 and a user device 1202. Internetwork apparatus 1223 is connected to a Web server 1210 and a video storage server 1211. Plurality of user devices 1201 is capable of perusing Web site 1210-held content information. User device 1202 is capable of sending moving-picture data to video storage server 1211.

Internetwork apparatus 1220 receives a packet from either user device 1201 or user device 1202, and routes this packet to either LSP 1205 or LSP 1208. Therefore, internetwork apparatus 1220 operates as an Ingress internetwork apparatus. Internetwork apparatus 1221 is positioned midway along LSP 1208, and routes a packet. Therefore, internetwork apparatus 1221 operates as a Core internetwork apparatus. Internetwork apparatus 1222 is positioned midway along LSP 1205, and routes a packet. Therefore, internetwork apparatus 1222 operates as a Core internetwork apparatus. Internetwork apparatus 1223 receives a packet from either LSP 1205 or LSP 1208, and routes this packet to either Web site 1210 or video storage server 1211. Therefore, internetwork apparatus 1223 operates as an Egress internetwork apparatus. Arrows 1207 show the flow of a packet sent from user device 1201. Arrows 1203 show the flow of a packet sent from user device 1202.

When Ingress internetwork apparatus 1220 comprises MPLS policy routing processing portion 104 shown in FIG. 2, Ingress internetwork apparatus 1220 operates as follows.

Policy condition storage portion 214 of MPLS policy routing processing portion 104, as shown in FIG. 4, stores layer information "QoS1" related to OSI Layer 3, layer information "TCP1" related to OSI Layer 4, and layer information "HTTP1" related to OSI Layer 5 correspondent to policy condition No. "5". Further, policy condition storage portion 214 stores layer information "QoS2" related to OSI Layer 3, layer information "UDP1" related to OSI Layer 4, and layer information "RTP1" related to OSI Layer 5 correspondent to policy condition No. "6". "QoS1" is the QoS information set in user device 1201. "QoS2" is the QoS information set in user device 1202. "TCP1" is TCP information of user device 1201, for example, a port number. "HTTP1" is HTTP (HyperText Transfer Protocol) information of user device 1201. "RTP1" is RTP (Real-Time Transport Protocol) information of user device 1202.

One entry of policy condition—label conversion table 204 of MPLS policy routing processing portion 104, as shown in FIG. 5, stores "Label5" correspondent to policy condition No. "5". Further, another entry of policy condition—label conversion table 204 stores "Lable6" correspondent to policy condition No. "6". "Label5" is the value of the label of LSP 1205. "Label6" is the value of the label of LSP 1208.

For example, a packet sent from user device 1201 comprises QoS information "QoS1", TCP information "TCP1" and HTTP information "HTTP1" as packet information. When Ingress internetwork apparatus 1220 receives this packet, MPLS policy routing processing controller 205 of MPLS policy routing processing portion 104 operates as described in 1-2. In this case, policy condition determining portion 202 recognizes that either QoS information "QoS1", TCP information "TCP1" or HTTP information "HTTP1" in the packet information matches either layer information "QoS1", "TCP1" or "HTTP1" stored in policy condition storage portion 214. Policy condition determining portion 202 reads out policy condition No. "5" corresponding to the matching layer information from policy condition storage portion 214, and notifies policy condition—label conversion table reference controller 203. Policy condition—label conversion table reference controller 203 finds policy condition No. "5" in policy condition—label conversion table 204, reads out "Label5" corresponding to policy condition No. "5" from policy condition—label conversion table 204, and notifies applicable convention selecting portion 211.

As described in 1-4 and 1-5, "Label5" is sent to label attaching/converting controller 212, and is attached to a received packet. Accordingly, as described in 1-6, Ingress internetwork apparatus 1220 transmits the packet to LSP 1205. In this case, Core internetwork apparatus 1222 routes the packet to Egress internetwork apparatus 1223 as described in 2-1 through 2-6. Egress internetwork apparatus 1223 receives the packet from LSP 1205, and operates as described in 3-1 through 3-6. That is, Egress internetwork apparatus 1223 deletes "Label5" from the packet. Then, Egress internetwork apparatus 1223 sends the packet to Web server 1210 in accordance with the packet information.

Conversely, a packet sent from user device 1202 comprises QoS information "QoS2", UDP information "UDP1" and RTP information "RTP1" as packet information. When Ingress internetwork apparatus 1220 receives this packet, policy condition determining portion 202 finds either layer information "QoS2", "UDP1" or "RTP1" stored in policy condition storage portion 214, reads out policy condition No. "6" corresponding to layer information thereof from policy condition storage portion 214, and notifies policy condition—label conversion table reference controller 203. Policy condition—label conversion table reference controller 203 finds policy condition No. "6" in policy condition—label conversion table 204, reads out "Label6" corresponding to policy condition No. "6" from policy condition—label conversion table 204, and notifies applicable convention selecting portion 211.

"Label6" is sent to label attaching/converting controller 212, and is attached to a received packet. Accordingly, Ingress internetwork apparatus 1220 transmits the packet to LSP 1208. In this case, Core internetwork apparatus 1221 routes the packet to Egress internetwork apparatus 1223 as described in 2-1 through 2-6. Egress internetwork apparatus 1223 receives the packet from LSP 1208, and operates as described in 3-1 through 3-6. That is, Egress internetwork apparatus 1223 deletes "Label6" from the packet. Then, Egress internetwork apparatus 1223 sends the packet to video storage server 1211 in accordance with the packet information.

When Ingress internetwork apparatus 1220 comprises MPLS policy routing processing portion 104 shown in FIG. 3, Ingress internetwork apparatus 1220 operates as follows.

One entry of policy condition—FEC table 302 of MPLS policy routing processing portion 104, as shown in FIG. 9, stores "FEC5" correspondent to policy condition No. "5" and layer information "QoS1" related to OSI Layer 3, layer information "TCP1" related to OSI Layer 4, and layer information "HTTP1" related to OSI Layer 5. Further, another entry of policy condition—FEC table 302 stores "FEC6" correspondent to policy condition No. "6" and layer information "QoS2" related to OSI Layer 3, layer information "UDP1" related to OSI Layer 4, and layer information "RTP1" related to OSI Layer 5. "FEC5" corresponds to LSP 1205. Further, "FEC6" corresponds to LSP 1208.

One entry of FEC—label conversion table 209 of MPLS policy routing processing portion 104, as shown in FIG. 7, stores "Label5" correspondent to "FEC5". Further, another entry of FEC—label conversion table 209 stores "Label6" correspondent to "FEC6".

As explained hereinabove, Ingress internetwork apparatus 1220 receives a packet sent from user device 1201. Thereupon, MPLS policy routing processing controller 300 of MPLS policy routing processing portion 104 operates as described in 4-2. In this case, policy condition—FEC table reference controller 301 recognizes that either QoS information "QoS1", TCP information "TCP1" or HTTP information "HTTP1" in the packet information matches either layer information "QoS1", "TCP1" or "HTTP1" in policy condition—FEC table 302. Policy condition—FEC table reference controller 301 reads out "FEC5" corresponding to the matching layer information from policy condition—FEC table 302, and notifies FEC—label conversion table reference controller 208. FEC—label conversion table reference controller 208 finds "FEC5" in FEC—label conversion table 209, reads out "Label5" corresponding to "FEC5" from FEC—label conversion table 209, and notifies label attaching/converting controller 212.

As described in 4-3 and 4-4, "Label5" is attached to a received packet. Accordingly, Ingress internetwork apparatus 1220 transmits the packet to LSP 1205.

Conversely, Ingress internetwork apparatus 1220 receives a packet sent from user device 1202. Thereupon, policy condition—FEC table reference controller 301 finds either layer information "QoS2", "UDP1" or "RTP1" in policy condition—FEC table 302, reads out "FEC6" corresponding to this layer information from policy condition—FEC table 302, and notifies FEC—label conversion table reference controller 208. FEC—label conversion table reference controller 208 finds "FEC6" in FEC—label conversion table 209, reads out "Label6" corresponding to "FEC6" from FEC—label conversion table 209, and notifies label attaching/converting controller 212.

"Label6" is attached to a received packet. Accordingly, Ingress internetwork apparatus 1220 transmits the packet to LSP 1208.

In this example, in the MPLS network, a packet is transmitted via a route corresponding to a QoS value.

What is claimed is:

1. A packet routing apparatus for receiving a packet, and routing the received packet in accordance with packet information included in the packet, comprising:
   an interface portion connected to a plurality of networks for sending/receiving a packet to/from the respective networks; and
   a relay portion connected to said interface portion for receiving a packet from said interface portion, deciding a destination apparatus according to packet information included in the packet, and sending the packet to said interface portion,
   wherein said relay portion comprises:
   a storage portion for storing at the least one policy condition, and at the least one label corresponding to the respective policy condition;
   a determining portion which determines whether any layer information included in the packet information matches any policy condition stored in said storage portion, and when at the least one layer information matches any policy condition, reads out a label corresponding to this policy condition from said storage portion; and
   an attaching portion for receiving a label read out by said determining portion, and transmitting a packet to which this label has been attached;
   and wherein said interface portion sends the packet in accordance with said label.

2. The packet routing apparatus according to claim 1, wherein said relay portion further comprises a converting portion, which, when a packet received by said interface portion comprises a label, receives this packet, converts this label to another different label, and transmits this packet.

3. The packet routing apparatus according to claim 1, wherein said relay portion further comprises a deleting portion, which, when a packet received by said interface portion comprises a label, receives this packet, deletes this label, and transmits this packet.

4. The packet routing apparatus according to claim 1,
   wherein at the least one route has been established beforehand between said packet routing apparatus and another packet routing apparatus;
   each label corresponds to a respective route; and
   said interface portion transmits a packet to a route corresponding to a label included in the packet.

5. A packet routing apparatus connected to a plurality of networks for receiving a packet from each of the networks, and routing a received packet to another network in accordance with packet information included in the packet, and comprising:
   a plurality of interface portions, each of which is connected to at the least one network for sending/receiving a packet to/from the network;
   a plurality of relay portions, each of which is connected to at the least one of said interface portions for receiving a packet from said interface portion, deciding a destination based on packet information included in the packet, and routing the packet either to another relay portion or to another interface portion according to the decided destination;
   a packet transmitting portion connected to said plurality of relay portions for transferring a packet transmitted from said relay portion to another relay portion; and
   at the least one policy routing portion connected to at the least one of said interface portions for sending/receiving a packet to/from said interface portion, said policy routing portion comprising:

a storage portion for storing at the least one policy condition, and at the least one label corresponding to the respective policy condition;

a determining portion which determines whether any layer information included in packet information matches any policy condition stored in said storage portion, and when at the least one layer information matches any policy condition, reads out a label corresponding to this policy condition from said storage portion; and an attaching portion for receiving a label read out by said determining portion, attaching this label to a packet, and transmitting the packet to said packet transmitting portion according to this label.

6. The packet routing apparatus according to claim 5, wherein each label corresponds to at the least one transmission route for transferring a packet to at the least one other packet routing apparatus;

each of said relay portions, upon receiving a packet comprising a label from said packet transmitting portion, sends the packet to any of said interface portions in accordance with this label and each of said interface portions, upon receiving a packet comprising a label from said relay portion, sends the packet to a transmission route corresponding to this label.

7. The packet routing apparatus according to claim 5, wherein said policy routing portion further comprises a converting portion, which, when a packet received from said interface portion comprises a label, replaces this label with another different label, and sends this packet to said packet transmitting portion.

8. The packet routing apparatus according to claim 5, wherein said policy routing portion further comprises a deleting portion, which, when a packet received from said interface portion comprises a label, deletes this label, and sends this packet to any of said relay portions.

9. The packet routing apparatus according to claim 5, wherein said policy routing portion further comprises:

a second storage portion for storing one or more address information, and one ore more labels corresponding to the respective address information; and a second determining portion which determines whether destination address information included in the packet information matches any address information stored in said second storage portion, and when the destination address information matches any address information, reads out a label corresponding to this address information from said second storage portion; and wherein said attaching portion receives the label read out by this second determining portion, attaches this label to a packet, and sends this packet to said packet transmitting portion in accordance with this label.

10. The packet routing apparatus according to claim 5, wherein said at the least one policy condition is address information, and said determining portion determines whether source address information included in packet information matches any address information stored in said storage portion.

11. A packet routing method for routing a packet in accordance with packet information included in the packet, comprising the steps of:

holding beforehand at the least one policy condition, and at the least one label corresponding to the respective policy condition;

receiving a packet comprising packet information;

determining whether any layer information included in packet information matches any of said policy conditions;

when at the least one said layer information matches any of said policy conditions, extracting a label corresponding to this policy condition;

attaching said extracted label to a received packet; and transmitting said received packet in accordance with said extracted label.

12. The routing method according to claim 11, further comprising the steps of:

deciding a destination according to address information included in the packet information when none of the layer information included in the packet information matches any of said policy conditions; and sending a packet to said decided destination.

13. The routing method according to claim 11, further comprising the steps of:

receiving a packet comprising a label;

converting said label to another different label; and sending the packet in accordance with said other label.

14. The routing method according to claim 11, further comprising the steps of:

receiving a packet comprising a label;

deleting said label from said packet;

deciding a destination according to address information included in said packet; and transmitting the packet to said decided destination.

15. The routing method according to claim 11, wherein each label corresponds to one arbitrary route for transmitting a packet, and said step for transmitting said packet sends said packet to the route corresponding to said label.

16. The routing method according to claim 11, wherein said at the least one policy condition is address information, and said determining step determines whether source address information included in packet information matches any of said address information.

* * * * *